United States Patent [19]

Guitarini

[11] Patent Number: 5,451,074
[45] Date of Patent: Sep. 19, 1995

[54] AIR BAG DOOR RELEASE MECHANISM

[75] Inventor: Mark S. Guitarini, Dover, N.H.

[73] Assignee: Davidson Textron, Inc., Dover, N.H.

[21] Appl. No.: 73,337

[22] Filed: Jun. 7, 1993

[51] Int. Cl.6 ............................................. B60R 21/16
[52] U.S. Cl. .................................. 280/728.3; 280/732; 411/392; 411/510
[58] Field of Search ...................... 280/728 B, 731, 732, 280/728 R; 403/2, 298; 411/392, 509, 510, 907

[56] References Cited

U.S. PATENT DOCUMENTS

| | | | |
|---|---|---|---|
| 3,708,179 | 1/1973 | Hulten | 280/150 |
| 4,589,179 | 5/1986 | Hulting, Jr. | 411/392 |
| 4,893,833 | 1/1990 | DiSalvo et al. | 280/732 |
| 4,964,653 | 10/1990 | Parker | 280/732 |
| 5,066,037 | 11/1991 | Castrigno et al. | 280/732 |
| 5,161,819 | 11/1992 | Rhodes, Jr. | 280/728 |
| 5,211,421 | 5/1993 | Catron et al. | 280/732 |
| 5,354,094 | 10/1994 | Matano et al. | 280/728 B |

FOREIGN PATENT DOCUMENTS

| | | | |
|---|---|---|---|
| 1289367 | 2/1969 | Germany | 411/509 |
| 2187785 | 9/1987 | United Kingdom | 403/298 |

Primary Examiner—Eric D. Culbreth
Attorney, Agent, or Firm—Reising, Ethington, Barnard & Perry

[57] ABSTRACT

An interior trim product and supplemental inflatable restraint assembly includes a canister for generating gas to inflate an air bag for deployment into the passenger compartment of a motor vehicle. Access to such assemblies is closed by a door that is held down by a cable release mechanism that will separate from the door as the door is opened during supplemental inflatable restrain deployment.

4 Claims, 4 Drawing Sheets

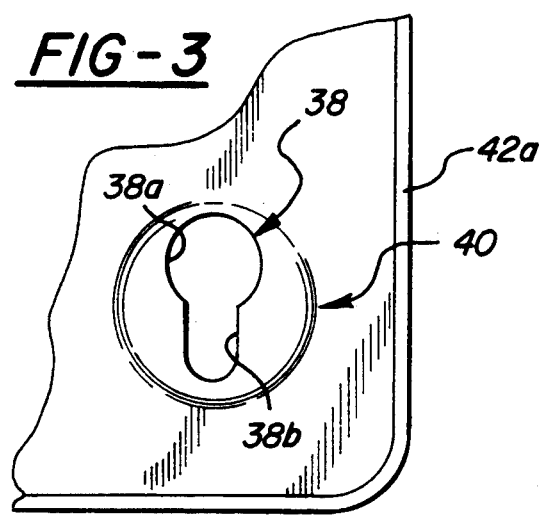
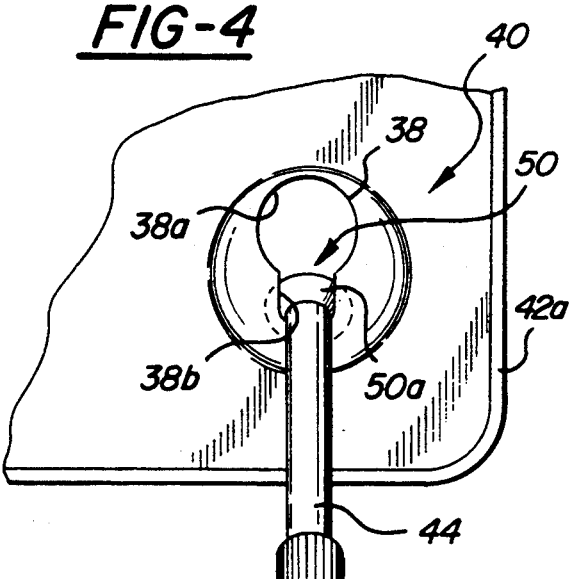
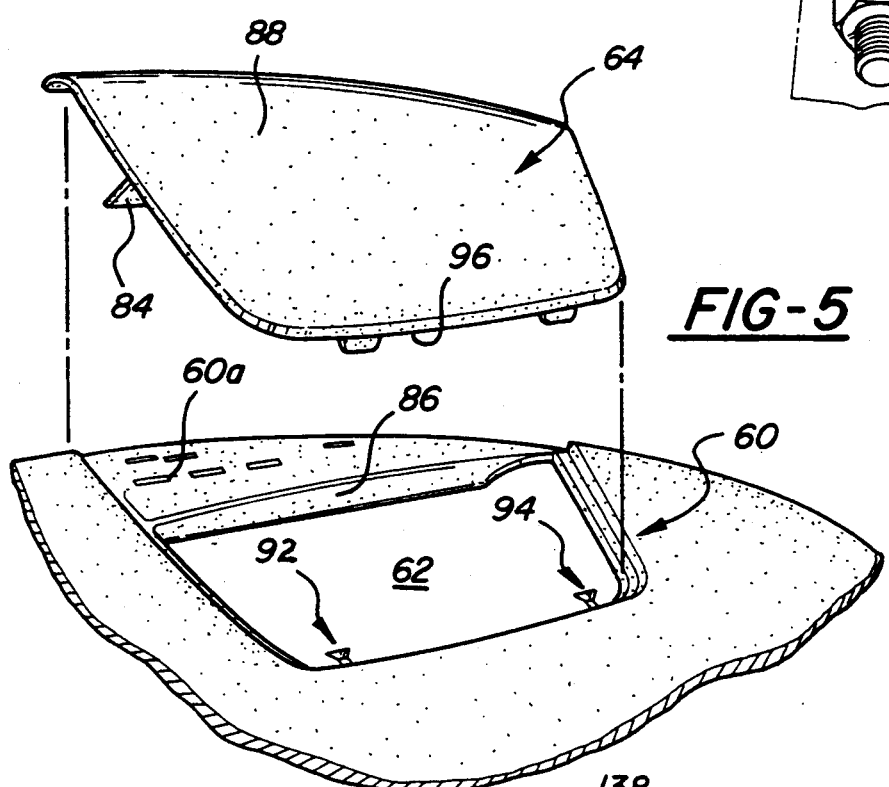
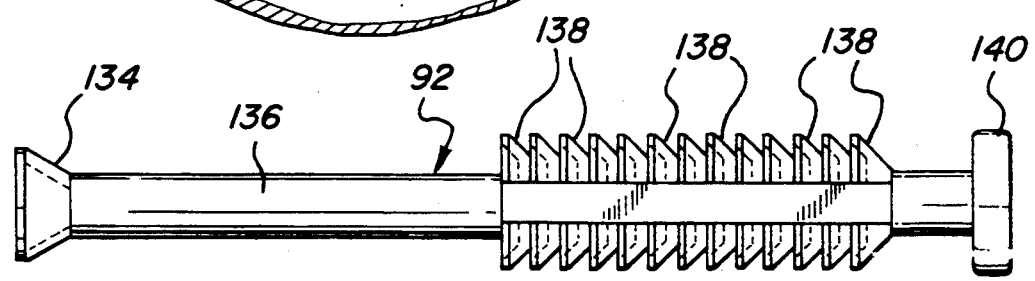

AIR BAG DOOR RELEASE MECHANISM

FIELD OF THE INVENTION

This invention relates to supplemental inflatable restraint systems for use in motor vehicles and more particularly to such supplemental inflatable restraint systems which are housed within an interior trim product of the vehicle behind or below an opening which is closed by a door that opens when an air bag is inflated.

BACKGROUND OF THE INVENTION

Supplemental inflatable restraint systems require a cover which opens to provide a path for deployment of an air bag into the passenger compartment as it is inflated.

Some of the prior art pads or covers for air bag devices are not soft and do not match or conform to the styling and aesthetic requirements of an associated interior trim product in which the supplemental inflatable restraint system is housed. Such covers are often formed from injection molded thermoplastic elastomers or thermoplastic olefins. While such materials are suitable for mid-mount locations such as on the front vertical surface of an instrument panel, they do not perform well if subjected to radiant heating, e.g., sunlight directed through a front windshield of a vehicle.

Other prior art pads or covers include a foamed interior which provide a soft feel and an outer skin of cast plastisol, e.g., polyvinyl chloride (PVC) or urethane skin, ABS/PVC/nitrile tripolymer vacuum formable sheet, dry cast polymer skins, or injection molded PVC, which can be aesthetically matched to the material of the outer surface of an interior product which houses the supplemental inflatable restraint system.

Examples of such prior art pads or covers are shown in U.S. Pat. No. 3,708,179 which discloses mid-mounted doors formed of a layer of urethane foam and an outer cover of a plastisol skin material. The '179 structure is supported on a pair of spaced hinge pins for movement outwardly of the front vertical face of an instrument panel so as to permit deployment of an air bag into the passenger compartment at the passenger side of the front seat.

U.S. Pat. Nos. 4,946,653 and 4,893,833 disclose door configurations for closing an upper mount configured supplemental inflatable restraint system wherein the door is located in an upper surface of an instrument panel and moved upwardly toward the windshield of the vehicle when the air bag is deployed.

One problem with such prior art systems has been how to hold down the rear edge (from the in car position) of the door adjacent the rear edge of the deployment opening in the interior trim product. In the case of top doors, the rear edge is located at a point where children can pry the door open unless it is firmly fastened in place by interlocking mechanical members. One problem with such interlocking structure is that it may not allow for a prompt and repeatable release of the door when an air bag is inflated to impact against the underside of the door. In such cases, the access door may not fully open and thereby may hinder unobstructed deployment of the air bag into the passenger compartment of a vehicle. One solution to such problems is set-forth in U. S. Pat. No. 5,161,819 that provides two hook and loop fastener strips one strip located on each of first and second substrates to define a specified hold down force. The hold down force is maintained over periods of use and variations in temperature extremes so as to assure release of the door to provide unobstructed deployment of the air bag into a passenger compartment when vehicle impact causes a gas generator to inflate the air bag. Each of the fastener strips is connected to one of the substrates to form a tamper proof connection for holding the door in place in the deployment opening prior to supplemental inflatable restrain deployment. The fastener strips are arranged to either release in tension or shear to allow for unrestrained movement of the door into an upwardly pivoted position between a windshield and the passenger compartment of a vehicle when a vehicle impact causes the air bag to be inflated for deployment into the passenger compartment. While suitable for their intended purpose such a tamper proof hold down arrangements have a hold down force that is dependent upon the area of connection between the hook and loop components. Additionally, the hold down force will be dependent upon the alignment of the respective components one to the other. In some arrangements such considerations present problems of selection and assembly.

Another hold down mechanism for a door closure in an supplemental inflatable restraint deployment system is set forth in U.S. Pat. No. 5,066,037 wherein a flange on the door closure is fit within a U-shaped clamp. In such arrangements the locking flange and clamp must be separately positioned and aligned during the assembly of the supplemental inflatable restraint deployment system.

SUMMARY OF THE INVENTION AND ADVANTAGES

Accordingly, an object of the present invention is to provide an improved supplemental inflatable restraint deployment system with an easily assembly hold down mechanism for fastening a door in a tamper proof closed position and wherein the hold down mechanism is located within the confines of an interior trim product following opening of the door in response to deployment of an air bag.

Another object of the present invention is to provide such a door and hold down mechanism wherein a cable is connected between first and second substrates respectively formed on the interior trim product and the door at a point closely adjacent the rear end of the door wherein the rear end is referenced with respect to the interior passenger compartment of a motor vehicle.

A further object of the invention is to provide a hold down mechanism for a door covering an supplemental inflatable restraint system that is easily manufactured and assembled and that will enable standard substrate configurations to be used in the foam molding manufacture while providing a hold down connection at the rear end of a door and the rear end of an access opening closed by the door that will release through a wide range of temperatures and following protracted periods of use and that will separate fully from the door and remain within the interior trim product following supplemental inflatable restrain deployment. The hold down connection is configured to maintain the door tamper proof.

A further object of the present invention is to provide a door assembly for closing an opening in an interior trim component of a vehicle in which an inflatable restraint assembly is housed for deployment of an air bag into the passenger compartment upon vehicle impact.

The interior trim component has an outer covering of cast vinyl material (or urethane or vacuum formed stock) around the opening with styling grains and colors for providing an aesthetic appearance and including a backing of soft foam material. A door for the opening has an outer cover of cast vinyl material (or the aforesaid equivalents thereof) with styling grains and colors corresponding to the outer covering of the interior trim component; the door has a shape corresponding to the opening in the interior trim component and is fit with respect to the opening for closing the opening and for preventing access to the air bag assembly; the door has a first substrate and the interior trim product has a second substrate, both substrates are located closely adjacent the rear edge of the opening and the rear edge of the door and a cable release mechanism is operative to hold the door in place over a wide range of temperature conditions and for extended periods of use; the cable release mechanism is operative at a specified force level when an air bag is inflated against the underside of the door so as to separate the door from the interior trim product when the air bag is inflated and deployed through the opening into the passenger compartment of a vehicle.

A still further object of the present invention is to provide a door assembly for closing an opening in an interior trim component of a vehicle in which an inflatable air bag assembly is housed for deployment of an inflated air bag into the passenger compartment upon vehicle impact. The interior trim component has an outer covering of cast vinyl material (or urethane or vacuum formed stock) around the opening with styling grains and colors for providing an aesthetic appearance. A door for the opening has an outer cover of cast vinyl material (or the aforesaid equivalents thereof) with styling grains and colors corresponding to the outer covering of the interior trim component; the door has a shape corresponding to the opening in the interior trim component and is fit with respect to the opening for closing the opening and for preventing access to the air bag assembly; the door has an insert with a configured hole therein located closely adjacent the rear edge of the opening and the rear edge of the door and a release mechanism includes a cable having one end thereof that is interlocked in the configured hole so as to be operative to hold the door in place with respect to the opening with the same hold down effectiveness over a wide range of temperature conditions and for extended periods of use; the cable further including an opposite end that fits through an anchor opening for locking the door closure in place and wherein the cable release mechanism is operative at a specified force level when an air bag is inflated against the underside of the door so as to slide the one end with respect to the configured hole to a position that will cause the cable to separate from the insert in the door and remain within the interior trim product when the air bag is inflated and deployed through the opening into the passenger compartment of a vehicle.

A feature of the present invention is to provide such a hold down mechanism that includes a smooth edge insert on the door having a geometrically configured slot therein located in a plane substantially parallel to an inner surface portion of the door and wherein a cable has a first end portion thereon configured to interlock within the configured slot and a second end portion that is connected to a self locking nut for pulling the cable member in a direction to cause the first end portion to engage the insert so as to pull the door into a closed, tamper proof relationship with respect to an interior trim product.

A further object of the present invention is to provide such a hold down mechanism in association with a door closure for an opening through which an inflatable restraint device such as an air bag is deployed following vehicle impact. The door further comprising an outer plastisol (or dry cast vinyl thermoplastic molded particles; urethane; or vacuum formed ABS/PVC) skin and a foam interior so that it will conform to the styling, feel and aesthetic appearance of an associated interior trim product which covers the inflatable restraint device.

Another object of the present invention is to provide a door assembly for closing an opening in an interior trim component of a vehicle in which a supplemental inflatable restraint is housed for deployment of an inflated air bag into the passenger compartment upon vehicle impact; the interior trim component having an outer covering around the opening having styling for providing an aesthetic appearance; a door having an outer cover with styling corresponding to the outer covering of the interior trim component; the door having a shape corresponding to the opening in the interior trim component and being fit with respect to the opening for closing the opening and the door having a substrate: and wherein the hold down mechanism is attached between the door and the interior trim component; the hold down mechanism including a cable mounting hole in association with the closure panel and the hold down mechanism further including a cable member having one end thereof adapted to releasably connect into the cable mounting hole and the cable member connected at the opposite end thereof to the interior trim product.

A further feature of the present invention is to provide a door assembly for closing an opening having a rear end, and sides formed in an interior trim component of a vehicle in which an inflatable air bag assembly is housed for deployment of an inflated air bag into the passenger compartment upon vehicle impact; the interior trim component having an outer covering providing an aesthetic appearance; a door having an outer cover with an appearance corresponding to the outer covering of the interior trim component; the door having a shape corresponding to the opening in the interior trim component and being fit with respect to the opening for closing the opening and access to the inflatable air bag assembly wherein the door has a first substrate including a cable mounting hole therein; a second substrate located adjacent the rear end of the opening and a cable connected thereto; and the cable engageable with the cable mounting hole for securing the door within the access opening to prevent tampering and unauthorized access to the air bag assembly and the cable being releasable from the door upon deployment of an air bag thereagainst.

Another feature of the present invention is a door assembly for closing an opening having a rear edge, a front edge located adjacent a windshield and having side edges in an interior trim component of a vehicle in which an inflatable air bag assembly is housed for deployment of an inflated air bag into the passenger compartment upon vehicle impact; the interior trim component having an outer covering around the opening having styling for providing an aesthetic appearance; a door; the door having a shape corresponding to the opening in the interior trim component and being fit with respect to the opening for closing the opening and for preventing access to the inflatable air bag assembly; and first and second substrates connected respectively to the door and the interior trim product; means forming a cable mounting hole in the first substrate and a cable connected to the second substrate and attachment surfaces between the cable mounting hole and the cable closely adjacent the rear edge of the opening; the attachment surfaces are operative in responsive to supplemental inflatable restrain deployment to cause the cable to slide out of interconnected relationship with the cable mounting hole for separating the door from the interior trim product at the rear edge of the opening when the air bag is inflated for causing the door to open for unobstructed deployment of an air bag through the opening into the passenger compartment of a vehicle between the windshield and an occupant of the vehicle.

Still another object of the present invention is to provide a supplemental inflatable restraint system having a door member with an inner surface and front and rear edges, an interior trim product having a door opening therein having a rear edge and a front edge; a hinge connecting the front edge of the door member to the interior trim product at the front edge of the door opening for pivotal movement upwardly with respect to the door opening and a restraint system for holding the door member against the interior trim product to prevent tampering with the supplemental inflatable restraint system including a cable hold down mechanism having a flexible cable; a bracket supported on the interior trim product; a member having a cable mounting hole formed therein secured to the door member on the inner surface thereof adjacent the rear edge thereof; and opposite ends of the cable connected respectively to the cable mounting hole and to the bracket for holding the door member in engagement with the interior trim product at the door opening therein; one end of the cable releasable from the cable mounting hole to separate the cable from the door upon air bag deployment.

Another feature of the present invention is to provide the supplemental inflatable restraint system of the preceding paragraph and further comprising a cable having a conically shaped member on one end thereof; the cable mounting hole having a large diameter segment and an elongated segment with a width less than the diameter of the large diameter segment; the conically shaped member insertable through the large diameter segment and moveable relative thereto into interlocked relationship with the elongated segment and the conically shaped member responsive to release of an air bag against the inner surface of the door to deform the elongated segment with respect to the cable mounting hole so as to move out of interlocked relationship with the elongated segment allowing the door to be disengaged from the cable and pivoted upwardly with respect to the interior trim product.

A still further feature of the present invention is to provide a supplemental inflatable restraint system having a lock member on a door; a geometrically configured slot formed in the door and a cable having a first end portion thereon configured to interlock within the configured slot and a second end portion that is connected to the interior trim product for pulling the cable member in a direction to cause the first end portion to engage the lock member so as to pull the door into a closed, tamper proof relationship with respect to the interior trim product and the first end portion slidably releasable from the lock member when an air bag is deployed.

A further feature of the invention is to provide the supplemental restraint system of the preceding paragraph wherein the second end portion has a threaded portion; and a locking nut engageable with the threaded portion for pulling the cable member in a direction to cause the first end portion to engage the lock member so as to pull the door into a closed, tamper proof relationship with respect to an interior trim product.

A still further feature of the present invention is to provide such a supplemental restraint system in which the cable comprises a plastic member having a conical head on one end thereof and having a plurality of axially spaced annular segments on the opposite end thereof selectively engageable with the interior trim product for providing an adjustable hold down force on the door to ensure that it is seated in a closed tamper proof relationship with respect to the door opening in the interior trim product.

Yet another feature of the present invention is to provide the supplemental restraint system of the preceding paragraph wherein the lock member is an L-shaped bracket and the cable hold down hole is formed in one leg of the L-shaped bracket and wherein the elongated segment of the hold down hole is directed laterally of the interior trim product.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a fragmentary elevational view of an insert with the cable mounting hole of the present invention;

FIG. 4 is an elevational view looking in the direction of the arrow in FIG. 2;

FIG. 5 is a fragmentary perspective view of an embodiment of the supplemental inflatable restraint with the door and instrument panel separated to show seating surfaces thereon;

FIG. 9 is an enlarged elevational view of a cable used in the embodiment of FIGS. 5-8.

DESCRIPTION OF PREFERRED
EMBODIMENTS OF THE INVENTION

Figure 1:
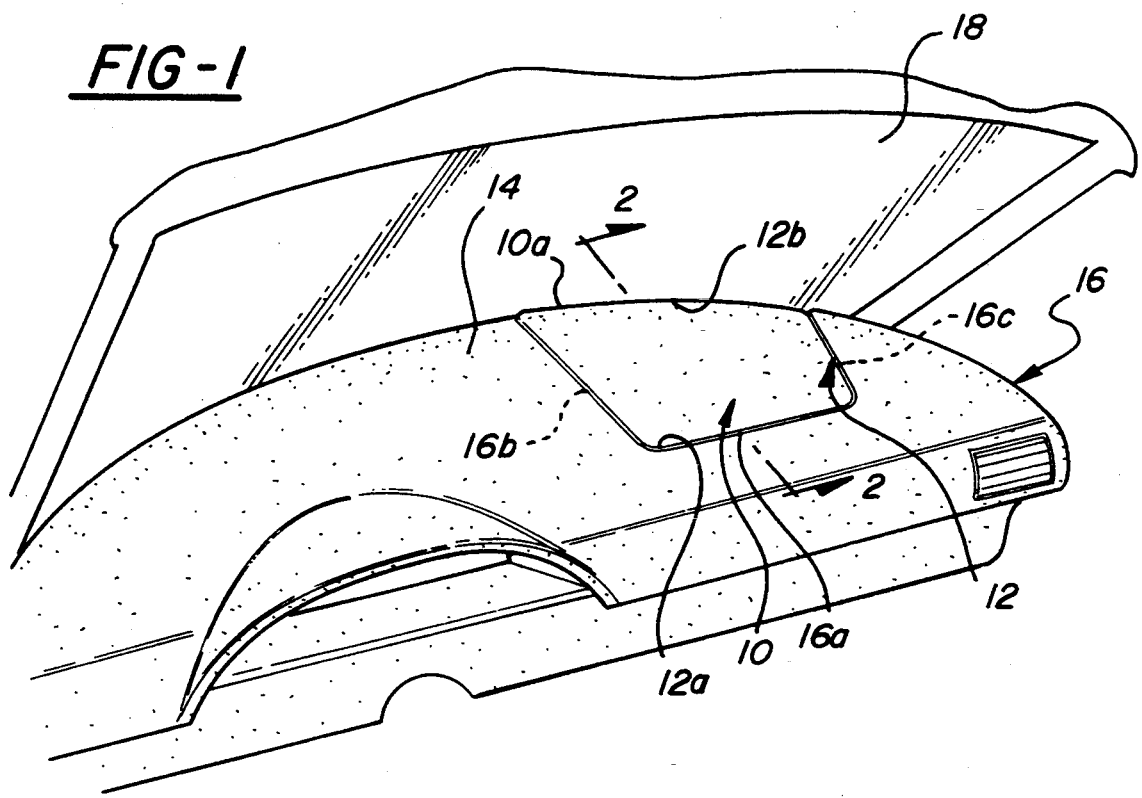
FIG. 1 is a perspective view of an instrument panel or dashboard which is one suitable interior trim product for housing and providing an opening for deployment of an inflatable restraint into the passenger compartment of a motor vehicle.

Referring now to FIG. 1, a door closure member 10 or closure panel 10 for closing an opening to a supplemental inflatable restraint system is shown. In this embodiment of the invention, the door 10 is shown in a top mount position in which it is located to cover an opening 12 formed through the top surface 14 of a dashboard or instrument panel 16. The opening 12 has a rear edge 12a located adjacent the rear 16a of the instrument panel 16. Opening 12 has a front edge 12b located in underlying relationship to a sloped front windshield 18. For purposes of this description, the reference to a forward or rearward location is made with respect to the position of the component within the passenger compartment of a motor vehicle.

While shown in the upper surface of the instrument panel 16, the opening 12 could also be formed in the rear surface 16a in a mid-mount position. The top mount or mid-mount of the door or door 10 depends upon the location of the underlying supplemental inflatable restraint system 20. In the illustrated embodiment of FIG. 2, the supplemental inflatable restraint system 20 includes a gas generator 22 located in a canister or casing 24 mounted on a suitable vehicle component not shown. The gas generator 22 has a plurality of openings 22a through which a suitable inflatant gas flows when an impact sensor 26 is actuated upon vehicle impact to condition a controller 28 to initiate gas generation all as is well known to those skilled in the art. While a pyrotechnic type inflatant generator is shown, the invention is equally suitable for use with inflatants such as pressurized gases held within a pressure vessel.

The inflatant gas is directed into the interior of an inflatable air bag 30 connected at one end 30a to the casing 24 and having convolutions 30b which expand as the air bag is inflated to impact against the underside of the door 10 to cause it to pivot upwardly toward the windshield 18 to allow for deployment of the air bag 30 through the opening 12 into a position to protect a passenger. While the present invention is shown in a passenger side location, the use of the hold down mechanism of the present invention is equally suitable for use in arrangements in which the supplemental inflatable restraint is located within a steering column and covered by a door that will open when the air bag is deployed to protect the driver of a motor vehicle.

In accordance with the present invention, the door 10 is shown as including a lip portion 32 that overlaps the surface of the instrument panel 16 not only at the rear surface 16a thereof but also at side surfaces 16b and 16c thereof. In this embodiment of the invention, the door 10 is connected to the instrument panel 16 by a hinge 34 that can be integrally connected bendable metal inserts between the instrument panel 16 at the front edge 12b of the opening 12 and the door 10 at the front edge 10a thereof.

A hold down mechanism 36 is provided that includes a cable mounting hole 38 (FIG. 3) formed in a door substrate or insert member 40. The insert member 40 is covered by a layer of decorative material 42 (FIG. 1) wrapped at its edge 42a around the edge of the insert member. In the embodiment of FIG. 1, that includes a color and texture that can correspond to the aesthetic appearance of the surrounding surface of the interior trim product.

The cable mounting hole 38 has a geometric shape that is semi-circular at a large diameter end portion 38a that is intersected by an elongated slot portion 38b having a width less than the diameter of the end portion 38a. Additionally, the elongated slot portion 38b has a length that is slightly greater than the diameter of the end 38a.

A hold down cable 44 is connected between the insert member 40 and an inwardly directed portion 46 of a substrate 48 of the instrument panel 16.

More particularly, the hold down cable 44 has one end thereof connected to an anchor member 50 having a conical surface 50a thereon that is dimensioned at one end to have a diameter substantially equal to that of the hold down cable 44 and less than the width of the elongated slot portion 38b. The other end of the conical surface 50a has a diameter that is greater than the width of the elongated slot 38b but less than the diameter of the large diameter end portion 38a such that when the member 50 is connected to the cable mounting hole 38 it first is slipped through the end portion 38a and then directed into the elongated slot portion 38b.

The opposite end of the hold down cable 44 is connected to a threaded member 52 that is directed through a hole 54 in the portion 46. The threaded member 52 is threadably connected to a self locking nut 56. The self locking nut 56 is tightened on the threaded member 52 to establish a length L between the portion 46 and the cable mounting hole 38 that will cause the rear edge and sides of the door 10 to be firmly held against the surfaces 16a, 16b and 16c to prevent the door 10 from being opened by tampering or the like. The threaded member 52 and nut 56 thus constitute adjustment members.

A feature of the present invention is that the cable mounting hole 38 is mounted in a segment 40a of the insert member 40 that is offset with respect to a surface 40b of the insert member 40 against which the air bag is deployed during a vehicle collision or other event that will cause deployment of the air bag 30 from the canister 24.

In accordance with the principles of the present invention, the offset angle between segment 40a and surface 40b is selected such that the conical surface 50a of the member 50 and the surface 40a define attachment surfaces that will react to produce a resultant force on the member 50 that causes the member 50 to deform the elongated slot portion 38b at which point the door member 10 is released to swing upwardly about the hinge 34 such that the opening 12 will be cleared for deployment of the air bag 30 therethrough.

Figure 2:
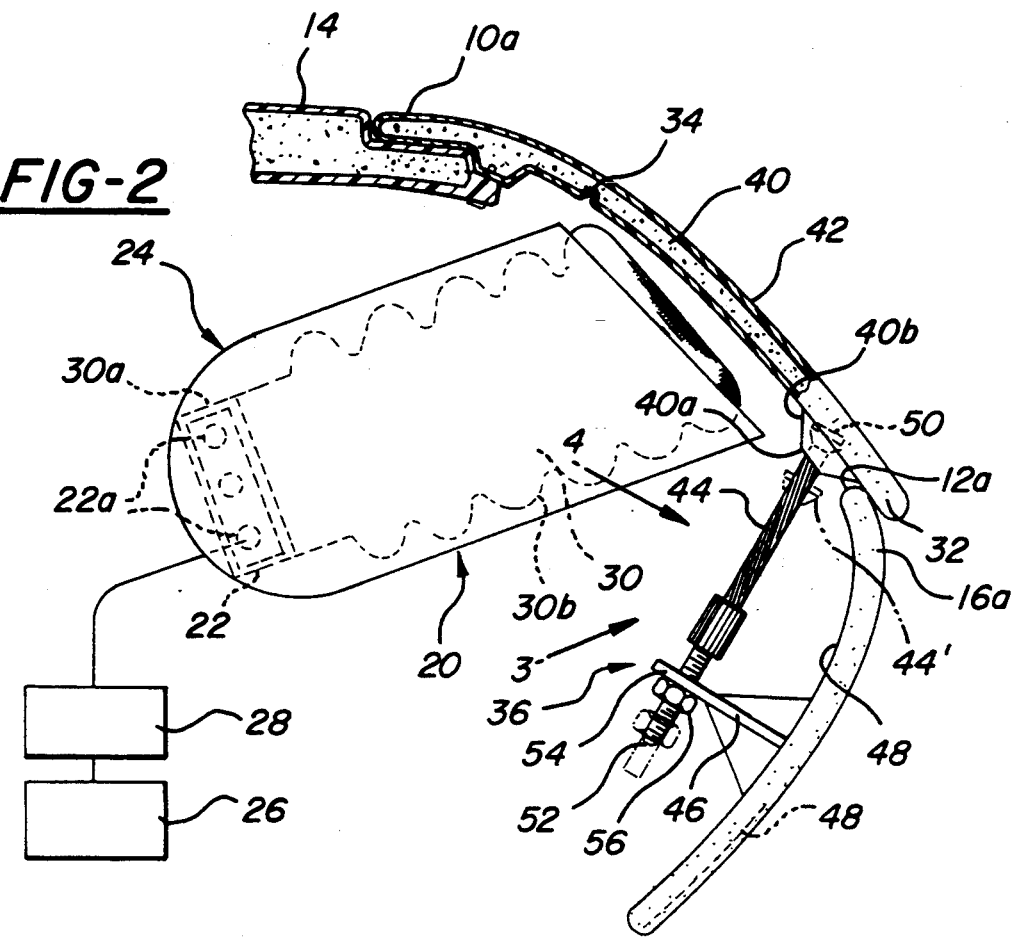
FIG. 2 is an enlarged sectional view of one embodiment of the invention taken along the line 2—2 of FIG. 1.

A feature of the present invention is that once the door 10 is released, the cable drops into the interior of the interior trim product as shown in broken line outline in FIG. 2 at 44'.

In the illustrated embodiment of FIGS. 1-4, a single cable hold down mechanism is located at the midpoint of the rear edge of the door 10. Additional cable hold down mechanisms can be provided to meet the force requirements and the configuration of the opening in the interior trim product and the configuration of the door.

In any case, the resultant product results in an arrangement following supplemental inflatable restrain deployment in which hold down components on both the door and the interior trim product remain at locations hidden within the door and the interior trim product.

The door can have a vinyl outer cover that can be formed from cast vinyl material by processes such as those set forth in U.S. Pat. Nos. 4,664,864 and 4,784,911, both commonly assigned to the same assignee as in the present application and incorporated by reference herein. Such outer covers have colors and grain appearances that are accurately matched to the appearance of the surface of an associated interior trim product such as the illustrated instrument panel. The vinyl outer cover can have edge portions thereon formed over the peripheral edge of a first construction substrate of the type which is mounted on a lid of a foam mold apparatus such as illustrated and described in U.S. Pat. No. 4,806,094, commonly assigned to the same assignee as the present invention and also incorporated by reference herein. In accordance with the present invention, the substrate can have construction holes which aid in its connection to standard mold apparatus lids and which will enable it to be located so as to form a sealed connection with respect to the outer cover and to define a space into which foam precursors are directed in a known manner for reaction to form a soft feel foam layer behind the cover such that a finished appearance will be formed at side surfaces of the door and the outer cover will be supported by the foam layer to match the styling and appearance of a foamed, interior trim product. The side surfaces conform to the shape of the opening 12 so that the door 10 will closely fit with respect to the opening 12 where it seats on suitable recessed support surfaces in the instrument panel 16.

The retention force defined by the cable hold down mechanism 36 remains the same over a wide range of operating conditions. Accordingly, a specified force required to release the door assembly 10 can be maintained by a predetermined number of the individual cable hold down mechanisms. The number of mechanisms can be selected for a particular interior trim product, canister and air bag design to assure that the door assembly will be tamper proof and yet open at the specified force when the air bag is inflated thereby to assure quick and unobstructed deployment of the air bag into the passenger compartment. In the embodiments of FIG. 1 and FIG. 5, the release is by a pull-out force which in certain applications would be in the order of between 0-100 lbs. per cable to provide a desired tamper proof hold down force for typical instrument panel applications of the type shown in FIG. 1 while providing desired door separation when the air bag 30 is inflated. The cable hold down mechanism is first connected to the door and then a tool (not shown) is used to thread the self-locking nut 56 in place until the lip portion 32 is firmly secured in a tamper proof relationship with the instrument panel surfaces 16a, 16b, 16c.

Figure 6:
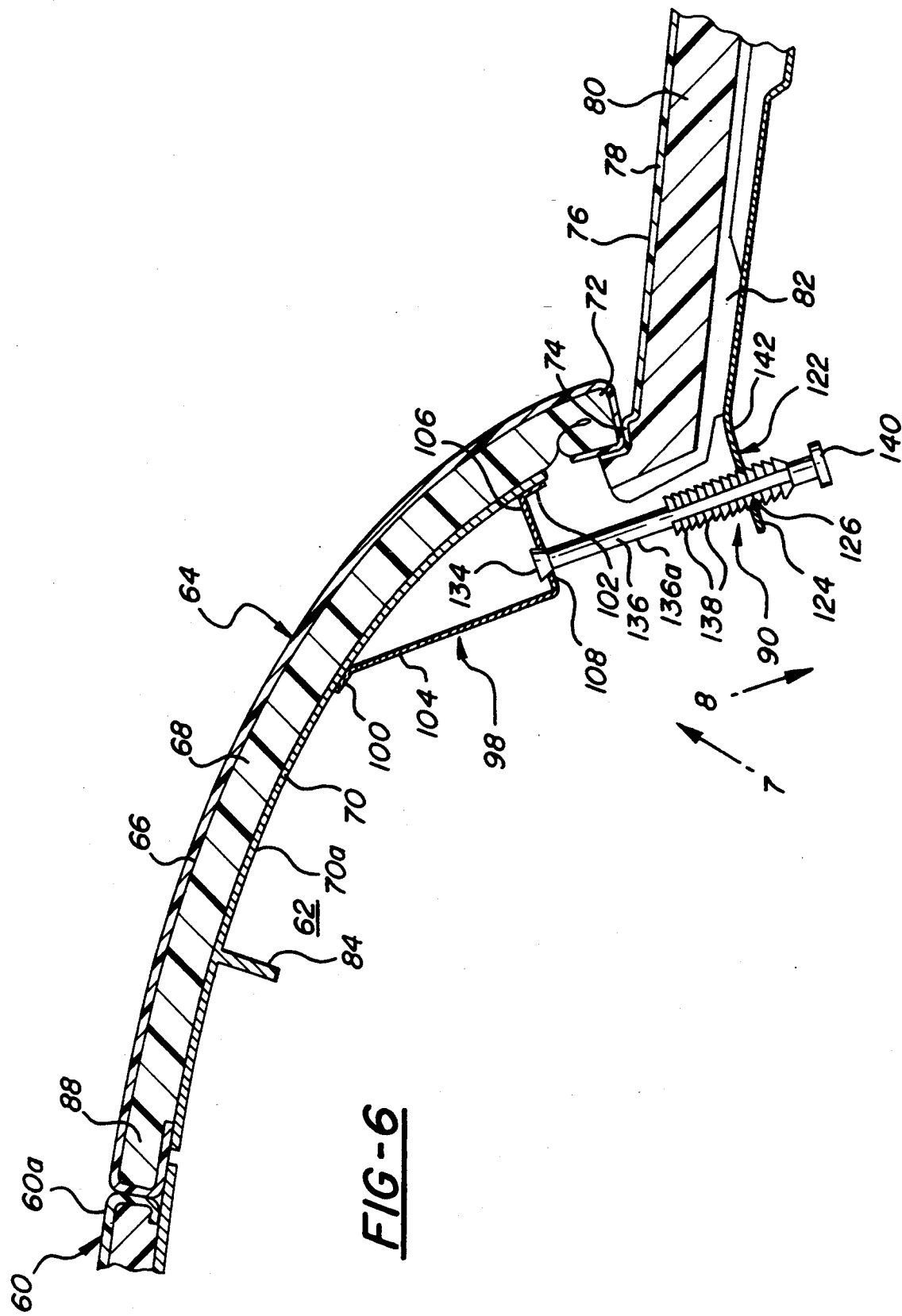
FIG. 6 is an enlarged sectional view of the embodiment of FIG. 5 showing the door closed.
Figure 7:
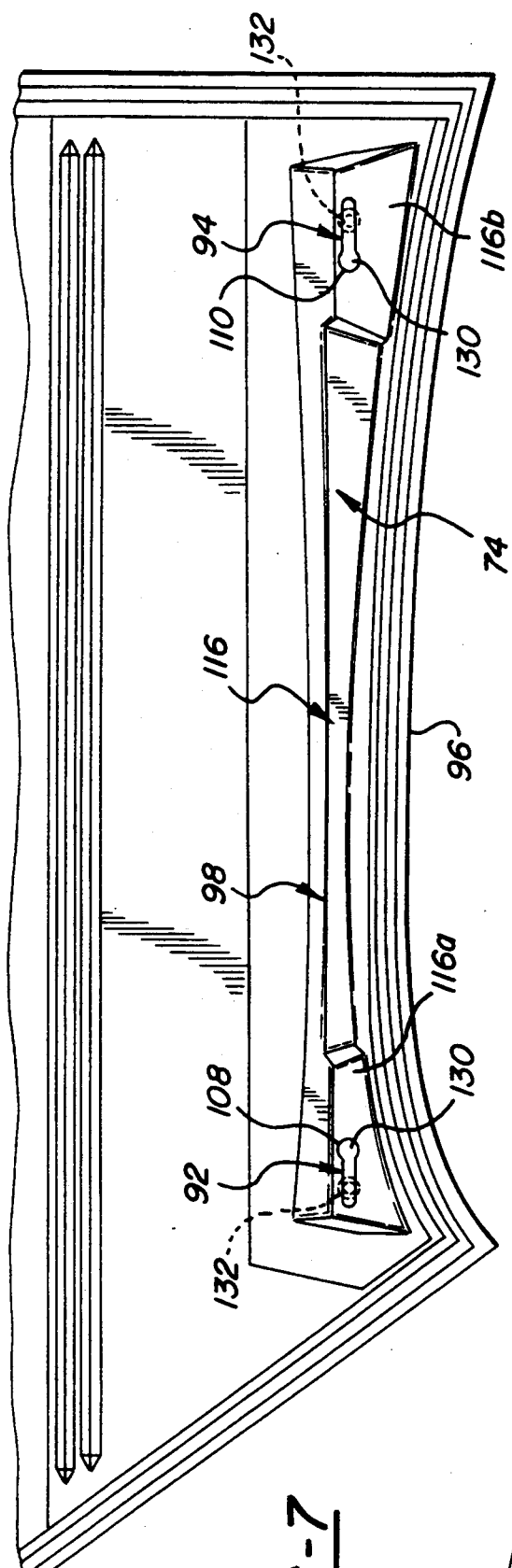
FIG. 7 is a fragmentary elevational view of the rear of the door looking in the direction of the arrow 7 in FIG. 6.

The embodiment of the invention shown in FIGS. 5-7, an instrument panel 60 is illustrated having a deployment opening 62 therein that covers an supplemental restraint system like that shown in the embodiment of FIGS. 1-4. In this embodiment of the invention the deployment opening 62 is closed by a door 64 having an outer decorative skin layer 66, a foam layer 68 and an inner substrate 70 all of the type described with respect to the embodiment of FIGS. 1-4. In this embodiment the rear edge 72 of the door 64 is held against a ledge 74 formed on a forwardly directed segment 76 of the instrument panel 60. The instrument panel 60, like that in the embodiment of FIGS. 1-4, includes an outer decorative layer 78, a foam layer 80 and an inner substrate member 82 for supporting the instrument panel 60 on the vehicle frame.

The door 64 is connected at a hinge member 84 thereon to the front edge 86 of the opening 62 for supporting the door 64 for upwardly directed pivotal movement in the direction of the windshield when the air bag is deployed. A front segment 88 of the door 64 overlaps a front surface of the instrument panel at 60a.

In accordance with the invention, the door 64 is held in a tamper proof closed position by a cable hold down mechanism 90 that includes a pair of cable assemblies 92, 94 (FIG. 5) on either side of the rear edge 96 of the door 64. A lock plate 98 is connected to the substrate 70 of the door 64 across its rear edge 96. The lock plate 98 is L-shaped, as shown in FIG. 6, and includes outwardly directed flanges 100, 102 connected to the substrate on either side of right angle bent segments 104, 106 that form the L-shape of the lock plate 98. The segment 106 has a pair of cable hold down openings 108, 110 that are connected to one end of the cable assemblies 92, 94, respectively.

Figure 8:
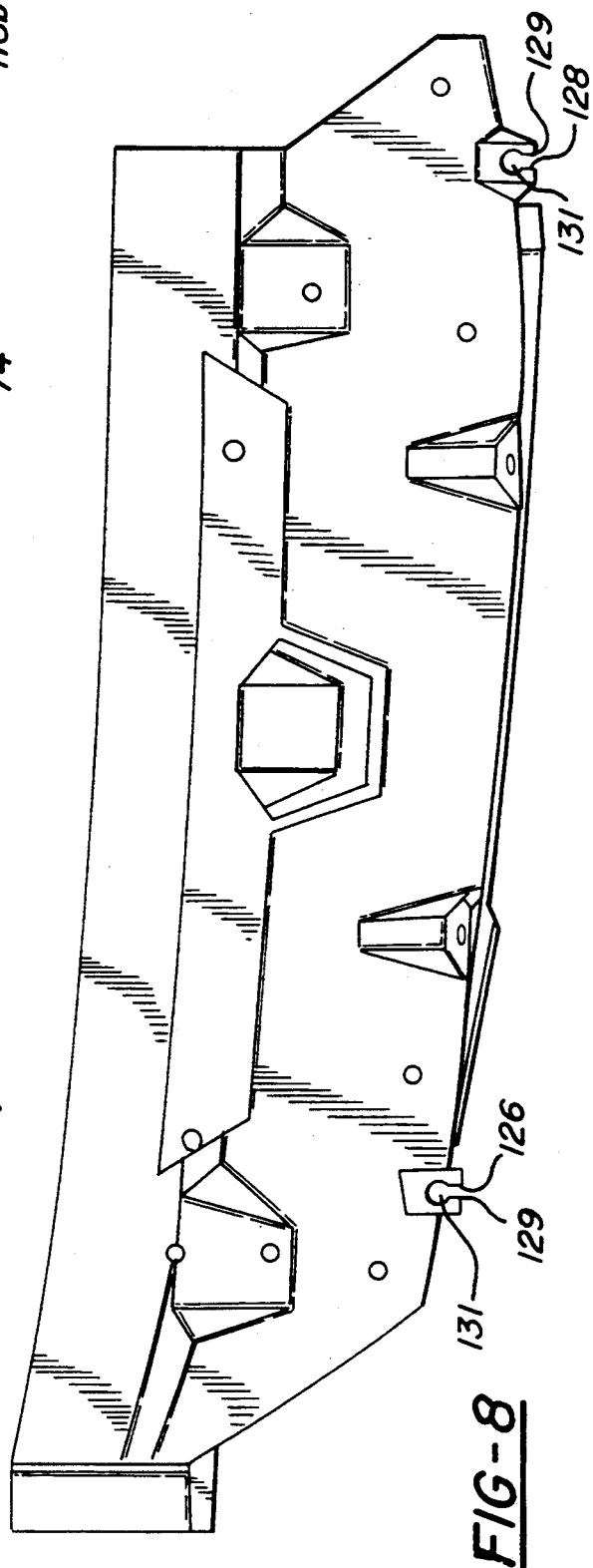
FIG. 8 is a fragmentary elevational view of an instrument panel substrate at the front edge thereof looking in the direction of the arrow 8 in FIG. 6.

The substrate 82 of the instrument panel 70 has a hold down bracket 122 connected thereto with a distal end 124 that extends inwardly and in spaced parallelism with the lock plate segment 106. The distal end 124 has spaced openings 126 and 128 therein (FIG. 8) that are connected to the other end of each of the cable assemblies 92, 94, respectively. Each of the spaced openings 126, 128 have a open side segment 129 and a seat segment 131 that will engage the cable assemblies 102, 104 when they are connected between the door 64 and the forwardly directed portion of instrument panel 76 for applying a tamper proof hold down force therebetween.

The cable hold down openings 108, 110 each include a large diameter segment 130 and an elongated side segment 132 that has a width less than the diameter of the segment 130 and a length that is greater than that of the diameter of the segment 130. The hold down openings 108, 110 are thereby adapted to interlock with a conically shaped anchor 134 formed on one end of a stem segment 136 of each of the cable assemblies 92, 94. The opposite end of the stem segment 136 has a plurality of axially spaced annular ribs or adjustment members 138 formed thereon that define a flexible fir tree configuration that will deflect radially inwardly toward the outer surface 136a of the stem segment 136 to enable the cable assemblies 92, 94 to be adjustably positioned within the hold down openings 126, 128 for varying the level of hold down force applied between the rear edge 72 of the door 64 and the ledge 74 thereby to provide a tamper proof connection therebetween. The stem segment 136 also includes a head portion 140 thereon having a diameter that will overlap the lower surface 142 of the brackets 122 to prevent the cable assemblies 92, 94 from separating from the flanges 122 as the door 64 is pivoted open in response to deployment of an air bag against the inner surface 70a of the inner substrate 70.

In accordance with the present invention, during such supplemental inflatable restraint deployment, the force acting on the inner surface 70a will be directed to the lock plate segment 116 that has canted segments 116a, 116b that will cause the conically shaped anchor 134 on each of the cable assemblies 92, 94 to be deformed by the elongated segments 132 such that the anchor will be free to release from the door 64.

The cables in both of the embodiments remain attached to an interior trim product. The cables, once detached will remain in their previous position within the interior of the interior trim product and the door will be deployed without the formation of rough tear edges thereon.

The door assembly of the subject invention thereby provides a soft skin door that is easily matched to adjacent interior trim products having foamed in place material and wherein the door assembly can be formed by standard foam molding apparatus without requiring special modifications to substrate components or without requiring modification of the lid for carrying such substrates during the foam molding of the door. A second substrate on the interior trim product and the door substrate are associated with a fastener construction which will separate without formation of debris during door opening while provide a temperature and vibration insensitive hold down force so that the door is tamper proof while being easily and quickly released. While the invention is shown in association with a door mounted in a dashboard or instrument panel, it is equally suitable for use with other interior trim products such as driver side steering wheel housings. The arrangement is manufactured not only with standard equipment practicing standard processing steps, it enables the door to be used in a more cost effective manner than the assemblies in the prior art.

The invention has been described in an illustrative manner, and it is to be understood that the terminology which has been used is intended to be in the nature of words of description rather that of limitation.

Obviously, many modifications and variations of the present invention in light of the above teachings may be made. It is, therefore, to be understood that within the scope of the appended claims, the invention may be practiced otherwise than as specifically described.

What is claimed is:

1. An inflatable restraint deployment system that simplifies the assembly of a hold down mechanism for fastening a door member of the deployment system in a tamper proof closed position, said hold down mechanism comprising a first member located on said door member; a second member located on an interior trim product and a third member that is connected between said first and second members and responsive to deployment of an air bag to fall downwardly relative to the second member and remain within the confines of an interior trim product following opening of the door in response to deployment of the air bag.

2. The supplemental inflatable restraint deployment system of claim 1, wherein said first member is a member having a hold down hole therein, said second member is a substrate on said interior trim product and said third member is an elongated member connected between said hold down hole and said substrate.

3. An inflatable restraint system having a door member having an inner surface and front and rear edges, an interior trim product having a door opening therein having a rear edge and a front edge; a hinge connecting the front edge of said door member to said interior trim product at said front edge of said door opening for pivotal movement upwardly with respect to said door opening and a restraint system for holding said door member against the interior trim product to prevent tampering with the supplemental restraint system comprising; said restraint system including a hold down mechanism having a hold down member; a member having a mounting hole formed therein secured to said door member on the inner surface thereof adjacent said rear edge thereof; and an anchor formed on each of said opposite ends of said hold down member connected respectively to said mounting hole and to said interior trim product for holding said door member in engagement with said interior trim product at the door opening therein; said hold down member comprising a plastic member; one of said anchors being a conical head on one end thereof engageable with said mounting hole and the other of said anchors being a plurality of axially spaced annular segments on the opposite end thereof selectively engageable with said interior trim product for providing an adjustable hold down force on said door to ensure that it is seated in a closed tamper proof relationship with respect to the door opening in said interior trim product.

4. An inflatable restraint deployment system that simplifies the assembly of a hold down mechanism for fastening a door member of the deployment system in a tamper proof closed position, said hold down mechanism comprising a first member located on said door member; a second member located with an interior trim product and a third member that is connected between said first and second members and responsive to deployment of an air bag to fall and remain within the confines of an interior trim product following opening of the door in response to deployment of the air bag, wherein said first member is a member having a hold down hole therein, said second member is on said interior trim product and said third member is an elongated member connected between said hold down hole and said substrate, said elongated member further comprising a plastic member having a conical head on one end thereof engageable with said mounting hole and having a plurality of axially spaced annular segments on the opposite end thereof selectively engageable with said second member for providing an adjustable hold down force on said door to ensure that it is seated in a closed tamper proof relationship with respect to a door opening in said interior trim product.

* * * * *